United States Patent [19]

Endo et al.

[11] Patent Number: 5,420,187
[45] Date of Patent: May 30, 1995

[54] PIGMENT DISPERSING AGENT AND ITS USE

[75] Inventors: Atsushi Endo; Akimitsu Mochizuki; Michichika Hikosaka; Tsutomu Fujigamori, all of Tokyo, Japan

[73] Assignee: Toyo Ink Manufacturing Co., Ltd., Tokyo, Japan

[21] Appl. No.: 114,147

[22] Filed: Sep. 1, 1993

[30] Foreign Application Priority Data

Sep. 4, 1992 [JP] Japan .................. 4-263002
Sep. 4, 1992 [JP] Japan .................. 4-263003

[51] Int. Cl.$^6$ .................. C08L 33/00; C08K 5/23; C08K 5/34; C08F 4/04
[52] U.S. Cl. .................. 524/556; 524/88; 524/190; 526/204; 526/217; 526/218.1; 526/219; 526/259; 106/22 K; 106/23 K
[58] Field of Search .................. 526/204, 217, 259, 318, 526/318.4, 218.1, 219, 219.1; 524/190, 516, 518, 556; 106/23 H, 23 K, 22 H, 22 K

[56] References Cited

U.S. PATENT DOCUMENTS

| | | | |
|---|---|---|---|
| 3,344,098 | 9/1967 | Horiguchi et al. | 526/219 |
| 3,872,077 | 3/1975 | Dimroth et al. | 106/23 K |
| 4,412,349 | 11/1983 | Dimroth et al. | 106/23 K |
| 4,563,519 | 1/1986 | Dimorth et al. | 106/23 H |
| 4,883,714 | 11/1989 | Stockl et al. | 524/190 |
| 5,244,496 | 9/1993 | Easton et al. | 524/190 |

FOREIGN PATENT DOCUMENTS 1167161 10/1969 United Kingdom .
1167162 10/1969 United Kingdom .
1181287 2/1970 United Kingdom .

OTHER PUBLICATIONS

English abstract of SU 179926; Russ; Intrinscially coloured polyacrylonitrile using; Publication date unknown; see WPI Accession No. 68-78705 P/00.

Primary Examiner—Tae H. Yoon
Attorney, Agent, or Firm—Wenderoth, Lind & Ponack

[57] ABSTRACT

A pigment-dispersing agent obtained by polymerizing an addition-polymerizable monomer having an acidic functional group and other addition-polymerizable monomer in the presence of a polymerization initiator, the polymerization initiator being a diazotization product prepared by diazotizing at least one compound selected from the group consisting of an anthraquinone derivative having an aromatic amino group, an acridone derivative having an aromatic amino group and an organic dyestuff having an aromatic amino group. The above pigment-dispersing agent provides a water-based pigment dispersion which forms a water-based coating composition or water-based ink having excellent gloss, excellent clearness and high tinting strength, and the gloss, clearness and tinting strength of the water-based coating composition are comparable to those of existing oil coating compositions.

5 Claims, No Drawings

PIGMENT DISPERSING AGENT AND ITS USE

FIELD OF THE INVENTION

The present invention relates to a pigment dispersing agent which serves to give a water-based ink or coating composition which gives a coating excellent in gloss and tinting strength, a pigment composition containing the pigment dispersing agent and a water-based pigment dispersion containing the same.

PRIOR ART

With increasing demands for resource protection, environmental protection and improvement in working safety in recent years, coating compositions and inks are being converted to water-based ones.

Water-based coating compositions and water-based inks are required to have fluidity and storage stability and give coatings excellent in gloss, clearness and tinting strength similarly to oil coating compositions and oil inks. Since, however, most of pigments are very poor in dispersibility in water-based vehicles, no satisfactory water-based coating compositions or inks are obtained by usual-dispersion methods. It has been therefore attempted to use a variety of additives such as resins for dispersing pigments and surfactants. However, no water-based coating compositions or inks having properties comparable to those of existing oil coating compositions or inks are available. That is, a dispersion prepared by dispersing a pigment in the presence of a resin for the dispersion gives a coating which is somewhat excellent in gloss, clearness and tinting strength when used immediately after it is prepared. However, even such a dispersion is not necessarily sufficient in the field of coating compositions for automobiles, since the coating compositions in this field are required to give a coating having very high gloss, clearness and tinting strength.

SUMMARY OF THE INVENTION

It is an object of the present invention to provide a pigment-dispersing agent which improves the dispersibility of a pigment in a water-based vehicle.

It is another object of the present invention to provide a pigment-dispersing agent which gives a water-based pigment dispersion which gives a coating having excellent properties, i.e., excellent gloss and tinting strength.

According to the present invention, there is provided a pigment-dispersing agent obtained by polymerizing an addition-polymerizable monomer having an acidic functional group and other addition-polymerizable monomer in the presence of a polymerization initiator, the polymerization initiator being a diazotization product prepared by diazotizing at least one compound selected from the group consisting of an anthraquinone derivative having an aromatic amino group, an acridone derivative having an aromatic amino group and an organic dyestuff having an aromatic amino group.

Further, according to the present invention, there is provided a pigment composition containing 0.1 to 30 parts by weight of the above pigment-dispersing agent and 100 parts by weight of a pigment.

Furthermore, according to the present invention, there is provided a water-based pigment dispersion containing the above pigment composition and a water-dispersible resin.

DETAILED DESCRIPTION OF THE INVENTION

The anthraquinone derivative having an aromatic amino group or the acridone derivative having an aromatic amino group, used in the present invention, includes compounds in which an amino group directly bonds to an anthraquinone skeleton or an acridone skeleton, such as 1-aminoanthraquinone, 2-aminoanthraquinone, 1,2-diaminoanthraquinone, 1,4-diaminoanthraquinone, 1,5-diaminoanthraguinone, 1-aminoacridone, 2-aminoacridone, 1,2-diaminoacridone, 1,4-diaminoacridone and 1,5-diaminoacridone. Further, the above compounds may have substituent(s) such as nitro, sulfone, carboxyl, hydroxyl, alkyl, alkoxyl, halogen and mercapto groups in site(s) where these substituents can be substituted.

The above anthraquinone derivative or acridone derivative can be obtained by substituting an amino group in anthraquinone, an anthraquinone derivative having optional substituent(s), acridone or an acridone derivative having optional substituent(s) according to a conventional method. The above amino substitution can be carried out, for example, by nitrating the starting material such as anthraquinone or acridone with a mixed acid, and reducing the nitration product with a reducing agent such as a combination of a metal such as iron, zinc or tin with an acid such as hydrochloric acid or acetic acid, a combination of a metal such as iron, zinc or tin with an alkali such as sodium hydroxide or potassium hydroxide, hydrogen sulfide, an alkali metal salt of hydrogen sulfide, or hydrosulfide. Further, the amino substitution can be carried out by electrolytic reduction, catalytic reduction or other method in which a halogen group, a sulfone group or a hydroxyl group is replaced with an amino group by ammonolysis.

Further, the anthraquinone having an aromatic amino group or the acridone derivative having an aromatic amino group, used in the present invention, includes a compound in which an aromatic amino compound bonds to an anthraquinone skeleton or an acridone skeleton through a divalent binding group such as —$SO_2$—, —CO—, —$CH_2$NHCOCH$_2$— or —$CH_2$—. Further, the above compound may have substituent(s) such as nitro, sulfone, carboxyl, hydroxyl, alkyl, alkoxyl, halogen and mercapto groups in site(s) where these substituents can be substituted.

The above compound can be obtained by introducing a substituent such as —$SO_2$Cl, —COCl, —$CH_2$NHCOCH$_2$Cl or —$CH_2$Cl into anthraquinone, substituted anthraquinone, acridone or substituted acridone by a conventional method, and bonding a compound having both an aromatic amino group and a substituent which can bond to the above substituent such as an amino group or a hydroxyl group. The compound having both an aromatic amino group and the above-specified substituent includes o-phenylenediamine, m-phenylenediamine, 2-aminophenol, 3-aminophenol and 4-aminophenol.

The organic dyestuff used as a raw material for the pigment-dispersing agent of the present invention includes phthalocyanine dyestuffs, insoluble azo dyestuffs, azo lake dyestuffs, anthraquinone dyestuffs, quinacridone dyestuffs, dioxazine dyestuffs, diketopyrrolopyrrole dyestuffs, anthrapyrimidine dyestuffs, anthanthrone dyestuffs, indanthrone dyestuffs, flavanthrone dyestuffs, perinone dyestuffs, perylene dyestuffs and thioindigo dyestuffs. The organic dyestuff may be freely selected from the above dyestuffs, while it is industrially advantageous to select one having a color similar to a pigment used.

The organic dyestuff having an aromatic amino group, used as a raw material for the pigment-dispersing agent of the present invention, can be produced by any one of the following three synthesis methods.

(1) A method in which an existing organic dyestuff is subjected to amino substitution according to a conventional method.

(2) A method in which a pigment is synthesized from an amino-substituted raw material.

(3) A method in which a substituent such as —SO$_2$Cl, —COCl, —CH$_2$NHCOCH$_2$Cl or —CH$_2$Cl is introduced into an existing organic dyestuff according to a conventional method, and a compound having both an aromatic amino group and a substituent which can bond to the above substituent such as an amino group or a hydroxyl group is allowed to bond to the above substituent.

The above three synthesis methods are known, and can be easily carried out.

The anthraquinone derivative having an aromatic amino group, the acridone derivative having an aromatic amino group or the organic dyestuff having an aromatic amino group, used in the present invention, can be diazotized according to a known method of diazotizing an aromatic primary amine. This diazonium salt can be isolated, as required, in the form of a stabler double salt in the presence of a stabilizer such as zinc chloride or stannic chloride.

The pigment-dispersing agent of the present invention can be produced by a method in which a diazotization product from the anthraquinone derivative having an aromatic amino group, the acridone derivative having an aromatic amino group or the organic dyestuff having an aromatic amino group is decomposed in the presence of an addition-polymerizable monomer having an acidic functional group and other addition-polymerizable monomer to form a free radical, and these addition-polymerizable monomers are polymerized in the presence of the free radical as a polymerization initiator and at the same allowed to form a covalent bond with the above anthraquinone derivative, acridone derivative or organic dyestuff.

The above polymerization may be carried out by any one of known methods such as solution polymerization, emulsion polymerization, suspension polymerization and bulk polymerization. When the pigment-dispersing agent of the present invention is used in a Water-based vehicle, it is advantageous to employ solution polymerization in a water-soluble organic solvent or emulsion polymerization.

The above polymerization is further preferably carried out by a method in which the anthraquinone derivative having an aromatic amino group, the acridone derivative having an aromatic amino group or the organic dyestuff having an aromatic amino group is dissolved in concentrated sulfuric acid, nitrosyl sulfate is added to prepare a solution of a diazotization product in sulfuric acid, then this solution is poured into a solution, dispersion or emulsion of the addition-polymerizable monomers to prepare a solution, dispersion or emulsion of the finely dispersed diazotization product in the above monomers, and the decomposition of the diazotization product and the polymerization of the monomers are carried out in the above solution, dispersion or emulsion. The above solution, dispersion or emulsion may be separated into several portions, and the decomposition of the diazotization product and the polymerization of the monomers may be carried in one portion, and the remaining portion(s) may be added later. Further, a solution of the diazotization product in sulfuric acid, or a solution, dispersion or emulsion of the isolated diazotization product or the above monomers may be added after the initiation of the polymerization as required. When the above polymerization method is used, the pigment-dispersing agent can be obtained at high yields.

The diazotization product can be decomposed by heating the reaction system up to 40° to 120° C. or reducing it with an inorganic or organic reducing agent. The inorganic or organic reducing agent includes alkali metals and alkaline earth metals such as sodium, lithium, magnesium and calcium; heavy metals such as zinc, aluminum, iridium, chromium, tin, cerium, titanium, iron, copper and vanadium; salt compounds of these heavy metals; metal hydrides such as diisobutyl aluminum hydride, organic tin hydride and hydrosilane; metal hydrogen complex compounds such as lithium aluminum hydride, sodium aluminum hydride, sodium borohydride, lithium borohydride, calcium borohydride, potassium borohydride, zinc borohydride and tetralkylammonium borohydride; didofane; substituted diborane; hydrazinc; diimide; and phosphorus compounds such as trialkylphosphine, triphenylphosphine, trialkylphosphite and hexamethylphosphorustriamide.

The amount ratio between the addition-polymerizable monomers and the polymerization initiator which is the diazotization product from the anthraquinone derivative, acridone derivative or organic dyestuff is as follows. The amount of the addition-polymerizable monomers per mole of the polymerization initiator is 10 to 10,000 moles, and the amount ratio is preferably selected such the pigment-dispersing agent has a weight average molecular weight of 2,000 to 100,000. In some cases, further, unreacted polymerization initiator may remain since the polymerization initiator exhibits a different reaction ratio depending upon a difference in the polymerization reaction system. However, the remaining unreacted polymerization initiator does not affect the performance of the pigment-dispersing agent at all.

The addition-polymerizable monomers include unsaturated carboxylic acids; derivatives thereof such as esters, acid anhydrides, acid chlorides, acid amides, methylol acid amides and alkylmethylol acid amides; vinyl monomers; diene monomers and ethylene.

The addition-polymerizable monomer having an acidic functional group is selected from unsaturated carboxylic acids such as acrylic acid, methacrylic acid, crotonic acid, iraconic acid, maleic acid and fumaric acid.

The "other addition-polymerizable monomer" is selected from alkyl carboxylates such as methyl(meth)acrylate, ethyl(meth)acrylate, propyl(meth)acrylate, n-butyl(meth)acrylate, isopropyl(meth)acrylate, isobutyl(meth)acrylate, 2-ethylhexyl(meth)acrylate, n-hexyl(meth)acrylate, lauryl(meth)acrylate, 2-hydroxyethyl(meth)acrylate, 2-hydroxypropyl(meth)acrylate, (meth)acrylamide, N-methylolacrylamide, diacetoneacrylamide, glycidyl(meth)acrylate, (meth)acrylic acid chloride, methyl crotonate, ethyl crotonate, propyl crotonate, n-butyl crotonate, isopropyl crotonate, isobutyl crotonate, 2-ethylhexyl crotonate, n-hexyl crotonate, lauryl crotonate, 2-hydroxyethyl crotonate, 2-hydroxypropyl crotonate, crotonamide, N-methylolcrotonamide, diacetonecrotonamide, glycidyl crotonate, crotonic acid chloride, monomethyl itaconate, monoethyl itaconate, monopropyl itaconate, mono-n-butyl itaconate, monoisopropyl traconate, monoisobutyl itaconate, mono-2-ethylhexyl itaconate, mono-n-hexyl itaconate, monolauryl itaconate, mono-2-hydroxyethyl itaconate, mono-2-hydroxypropyl itaconate, itaconamide, N-methylolitaconamide, diacetoneitaconamide, monoglycidyl itaconate, iraconic acid chloride, dimethyl itaconate, diethyl itaconate, dipropyl itaconate, di-n-butyl itaconate, diisopropyl itaconate, diisobutyl itaconate, di-2-ethylhexyl itaconate, n-hexyl itaconate, dilauryl itaconate, di-2-hydroxyethyl itaconate, di-2-hydroxypropyl itaconate, itacondiamide, N,N-dimethylolitacondiamide, diacetoneitacondiamide, diglycidyl itaconate, itaconic arthydride, monomethyl maleate, monopropyl maleate, mono-n-butyl maleate, monoisopropyl maleate, monoisobutyl maleate, mono-2-ethylhexyl maleate, mono-n-hexyl maleate, monolauryl maleate, mono-2-hydroxyethyl maleate, mono-2-hydroxypropyl maleate, maleinmonoamide, N-methylolmaleinamide, diacetonemaleinamide, monoglycidyl maleate, maleic acid chloride, dimethyl maleate, diethyl maleate, dipropyl maleate, di-n-butyl maleate, diisopropyl maleate, diisobutyl maleate, di-2-ethylhexyl maleate, di-n-hexyl maleate, dilauryl maleate, di-2-hydroxyethyl maleate, di-2-hydroxypropyl maleate, maleindiamide, N,N-dimethylolmaleindiamide, diaceto, maleindiamide, diglycidyl maleate, maleic anhydride, monomethyl fumarate, monoethyl fumarate, monopropyl fumarate, monopropyl fumarate, mono-n-butyl fumarate, monoisopropyl fumarate, monoisobutyl fumarate, mono-2-ethylhexyl fumarate, mono-n-hexyl fumarate, monolauryl fumarate, mono-2-hydroxyethyl fumarate, mono-2-hydroxypropyl fumarate, fumalamide, N-methylolfumalamide, diacetonefumalamide, monoglycidyl fumarate, fumaric acid chloride, dimethyl fumarate, diethyl fumarate, dipropyl fumarate, di-n-butyl fumarate, diisopropyl fumarate, diisobutyl fumarate, di-2-ethylhexyl fumarate, di-n-hexyl fumarate, dilauryl fumarate, di-2-hydroxyethyl fumarate, di-2-hydroxypropyl fumarate, fumaldiamide, N,N-dimethylolfumaldiamide, diacetonefumaldiamide and diglycidyl fumarate; vinyl monomers such as vinyl acetate, vinyl alcohol, vinyl chloride, vinyltoluene, styrene, vinyl methyl ether, vinyl ethyl ether, vinyl propyl ether, vinyl n-butyl ether, vinyl isopropyl ether, vinyl isobutyl ether, acrylonitrile, vinylidene chloride, vinyl fluoride, vinylidene fluoride, vinyl carbazole, vinyl pyrrolidone, vinyl pyridine and vinyl imidazole; and diene monomers such as butadiene, chloroprene and isoprene.

The addition-polymerizable monomer having an acidic functional group (selected from the above unsaturated carboxylic acids) is an essential component, while the "other" addition-polymerizable monomer is advantageously used if it has a composition similar to that of a resin used as a vehicle in which a pigment is to be dispersed. The amount of the addition-polymerizable monomer having an acidic functional group (unsaturated carboxylic acid) based on the total amount of the monomers is preferably 5 to 30% by weight.

The pigment-dispersing agent of the present invention can have an effect on water-based inks and coating compositions of almost all types when the addition-polymerizable monomers are suitably selected from the above monomers. Further, the pigment-dispersing agent of the present invention has a high effect on a water-based ink or coating composition composed of a water-soluble or water-dispersible resin of an acryl copolymer type alone or a mixture of water-soluble or water-dispersible resins of an acryl copolymer type. Further, the pigment-dispersing agent derived from the anthraquinone derivative or acridone derivative can be advantageously used for inks and coating compositions having any colors, since the pigment-dispersing agent itself is rarely colored.

The pigment-dispersing agent of the present invention can be used in any form of a powder and a solution or dispersion in a solvent compatible to an ink or coating composition for which the pigment-dispersing agent is to be used. When the pigment-dispersing agent of the present invention is used in a water-based vehicle, it is industrially advantageous to use a solution or dispersion prepared by neutralizing the pigment-dispersing agent with an inorganic alkali, ammonia, or an organic amine and adding water or a water-based dispersion of the pigment-dispersing agent obtained by emulsion polymerization.

The alkali used for the above neutralization includes sodium hydroxide, potassium hydroxide, calcium hydroxide, sodium carbonate and sodium hydrogen carbonate. The organic amine includes methylamine, dimethylamine, trimethylamine, ethylamine, diethylamine, triethylamine, propylamine, dipropylamine, tripropylamine, butylamine, dibutylamine, tributylamine, isobutylamine, diisobutylamine, 2-butaneamine, N-(1-methylpropyl)-1-propaneamine, N,N-dimethylbutylamine, 1,2-dimethylpropylamine, N-ethyl-1,2-dimethylpropylamine, allylamine, triallylamine, N,N-dimethylallylamine, N-dimethylallylamine, 3-pentylamine, N,N-diisopropylethylamine, 2-(hydroxymethylamino)ethanol, 2-aminopropanol, 3-aminopropanol, triethanolamine, dimethylaminopropanol, N-isobutyldiethanolamine, 3-methoxypropylamine, 3-ethoxypropylamine, 3-propyloxypropylamine, 3-isopropyloxypropylamine and 3-butoxypropylamine.

When the pigment-dispersing agent in a dry powder form is used, it may be added at a time of dispersing a pigment, or it may be mixed with a pigment in advance. When a dispersion or solution of the pigment-dispersing agent in a solvent is used, the dispersion or solution may be added at a time of dispersing a pigment, or it may be added after a coating composition is formed. Further, the pigment-dispersing agent may be used in the form of a pigment composition prepared by adding the pigment-dispersing agent to a slurry of a pigment in water or a solvent to allow the pigment to adsorb the pigment-dispersing agent on the surface, filtering the mixture and optionally drying it.

The pigment composition of the present invention can be obtained by mixing the pigment-dispersing agent of the present invention with a pigment. The pigment-dispersing agent in a dry powder form may be mixed with a pigment. Further, the pigment composition of the present invention can be most easily obtained by adding a solution or dispersion of the pigment-dispersing agent in a solvent to a slurry of a pigment in water or a solvent, filtering the mixture and optionally drying it. When the pigment is an azo pigment, a pigment composition can be obtained by adding a powder, a solution or a dispersion of the pigment-dispersing agent during coupling to allow the pigment to adsorb the pigment-dispersing agent on the surface. When the pigment is a phthalocyanine pigment, a quinacridone pigment or a dioxazine pigment, a pigment composition can be obtained by adding a powder, a solution or a dispersion of the pigment-dispersing agent at a pigment-forming step by a salt milling method or a sulfuric acid solution method to allow the pigment to adsorb the pigment-dispersing agent on the surface.

The amount of the pigment-dispersing agent per 100 parts by weight of the pigment is 0.1 to 30 parts by weight. When this amount is less than 0.1 part by weight, no sufficient effect is obtained. When it exceeds 30 parts by weight, the pigment-dispersing agent affects the performance of a coating.

The pigment used in the present invention includes a phthalocyanine pigment, an insoluble azo pigment, an azo lake pigment, an anthraquinone pigment, a quinacridone pigment, a dioxazine pigment, a diketopyrrolopyrrole pigment, an anthrapyrimidine pigment, an anthanthrone pigment, an indanthrone pigment, a flavanthrone pigment, a perinone pigment, a perylene pigment, a thioindigo pigment, carbon black, iron oxide, white lead, red lead, ultramarine, prussian blue, cobalt oxide, titanium dioxide, titanium dioxide-coated mica, strontium chromate, titanium yellow, titanium black, zinc chromate, black iron, molybdenum red, molybdenum white, lithopone, emerald green, cadmium yellow, cadmium red and cobalt blue.

The water-based pigment dispersion of the present invention can be obtained by incorporating the pigment and the pigment-dispersing agent into a dispersion or solution of a water-based resin. Further, it can be also obtained by incorporating the pigment composition containing the pigment and the pigment-dispersing agent, into a dispersion or solution of a water-based resin. In the water-based pigment dispersion of the present invention, the amount of the pigment is 100 parts by weight, the amount of the pigment-dispersing agent is 0.1 to 30 parts by weight, and the amount of the water-based resin as a solid content is 5 to 200 parts by weight.

When the amount of the water-based resin is less than 5 parts by weight, the pigment is not completely dispersed. When it is more than 200 parts by weight, the pigment dispersion is poor in dispersion stability and undergoes precipitation or separation with time.

The pigment or the pigment composition can be dispersed in a dispersion or solution of the water-based resin with any one of a dissolver, a high-speed mixer, a homomixer, a sand mill and an attriter.

The water-based resin includes water-dispersible or water-soluble resins such as acryl copolymer resins, styrene-acrylate copolymer resins, styrene-maleate copolymer resins, alkyd resins, epoxy resins, polyester resins and urethane resins. In particular, acryl copolymer water-dispersible or water-soluble resins are preferred.

The acryl copolymer resin refers to a resin obtained by emulsion-polymerizing 50 to 80% by weight of alkyl (meth)acrylate, 5 to 30% by weight of a carboxylic acid-containing monomer such as acrylic acid, methacrylic acid, maleic acid or iraconic acid and 0 to 20% by weight of other monomer or solution-polymerizing these monomers in a water-soluble solvent, and has a weight average molecular weight of 5,000 to 300,000 and an acid value of 1 to 200. The above alkyl(meth)acrylate includes methyl(meth)acrylate, ethyl(meth)acrylate, propyl(meth)acrylate, n-butyl(meth)acrylate, isopropyl(meth)acrylate, isobutyl(meth)acrylate, 2-ethylhexyl(meth)acrylate, n-hexyl(meth)acrylate and lauryl(meth)acrylate. The above "other" monomer includes 2-hydroxyethyl(meth)acrylate, 2-hydroxypropyl(meth)acrylate, acrylamide, N-methylolacrylaminde, diacetoneacrylamide, glycidyl(meth)acrylate, styrene, vinyltoluene, vinyl acetate, acrylonitrile, vinyl alcohol and ethylene.

The above water-dispersible resin can be produced by dropwise adding a mixture of the above monomers to an aqueous medium containing an emulsifier and emulsion-polymerizing the monomers. A high-molecular-weight dispersant may be used in place of, in combination with, the emulsifier. The water-dispersible resin may be dispersed in water after a carboxylic acid contained in the resin has been neutralized by adding an amine or ammonia. For example, the acrylic copolymer resin synthesized in a hydrophilic organic solvent and having a free carboxylic acid is neutralized with ammonia or an organic amine and then dispersed in water. The organic amine is selected from those which are already described.

The above water-soluble resin can be obtained by neutralizing the acrylic copolymer resin obtained from the above monomers and having a free carboxylic acid with the above organic amine, and adding water.

The water-based medium for the water-based resin used in the present invention may be water itself, while it may contain an alcohol solvent such as ethyl alcohol, isopropyl alcohol, n-propyl alcohol or n-butanol or a water-miscible organic solvent such as mono- or dialkyl ether of ethylene glycol or diethylene glycol in an amount of up to 50% by weight based on the water based medium.

The water-based pigment dispersion of the present invention can be used as a water-based printing ink, a water-based coating composition or a concentrated dispersion therefor.

The pigment-dispersing agent of the present invention provides the water-based pigment dispersion which forms a water-based coating composition or water-based ink having excellent gloss, excellent clearness and high tinting strength. The pigment-dispersing agent of the present invention provides the water-based pigment dispersion which forms a water-based coating composition whose gloss, clearness and tinting strength are comparable to those of existing oil coating compositions.

The pigment-dispersing agent derived from the anthraquinone derivative or acridone derivative is colorless itself, and can be used as a general pigment-dispersing agent without taking pigment colors into consideration.

EXAMPLES

The pigment-dispersing agents derived from the anthraquinone derivative and the acridone derivative, and the production of the water-based coating compositions containing the pigment-dispersing agents will be explained hereinafter by reference to Examples, In Examples, "part" stands for "part by weight", and "%" stands for "% by weight".

Preparation Example 1

Preparation of dispersing agent 0.7 Part of sodium nitrite was added to 20 parts of cooled 98% sulfuric acid, and the mixture was heated up to 70° C. The mixture was again cooled, and 2.2 parts of 2-aminoanthraquinone was added at a temperature of 10° C. or lower. The mixture was stirred at 10° C. for 1 hour, and then added dropwise to a solution containing 10 parts of ethyl acrylate cooled to 10° C. or lower, 10 parts of methyl methacrylate, 5 parts of methacrylic acid and 50 parts of diethylene glycol dimethyl ether. These monomers were polymerized by heating the mixture in nitrogen current at 80° C. for 2 hours, and then 100 parts of water was added to precipitate a resin content. The resin content was recovered by filtration, washed with water, dried and milled to give 24 parts of a resin powder, Preparation Example 2

Preparation of dispersing agent 0.7 Part of sodium nitrite was added to 20 parts of cooled 98% sulfuric acid, and the mixture was heated up to 70° C. The mixture was again cooled, and 2.2 parts of 2-aminoanthraquinone was added at a temperature of 10° C. or lower. The mixture was stirred at 10° C. for 1 hour and then added dropwise to 200 parts of 25% zinc chloride aqueous solution cooled to 10° C. or lower to precipitate a zinc chloride double salt of a diazonium compound. The double salt was recovered by filtration and washed with water to obtain a press cake. The press cake was dispersed in a solution containing 10 parts of ethyl acrylate, 10 parts of methyl methacrylate, 5 parts of methacrylic acid and 50 parts of diethylene glycol dimethyl ether, and the mixture was stirred in nitrogen current for 30 minutes. Then, 5 parts of a 20% titanium trichloride aqueous solution was added, and these monomers were polymerized at 60° C. for 2 hours. The reaction mixture was adjusted to pH 8 with a triethanolamine aqueous solution to give 99 parts of a resin dispersion having a solid content of 22%.

Preparation Example 3

Preparation of dispersing agent 0.7 Part of sodium nitrite was added to 20 parts of cooled 98% sulfuric acid, and the mixture was heated up to 70° C. The mixture was again cooled, and 2.2 parts of 2-aminoanthraquinone was added at a temperature of 10° C. or lower. The mixture was stirred at 10° C. for 1 hour, and then added dropwise to 200 parts of 25% zinc chloride aqueous solution cooled to 10° C. or lower to precipitate a zinc chloride double salt of a diazonium compound. The double salt was recovered by filtration and washed with water to obtain a press cake. The press cake was dispersed in a cooled emulsifier solution containing 1,000 parts of ethyl acrylate, 1,000 parts of methyl methacrylate, 500 parts of methacrylic acid, 200 parts of sodium laurylsulfate and 5,000 parts of water, and the mixture was stirred in nitrogen current for 30 minutes. Then, 500 parts of a 20% titanium trichloride aqueous solution was added, and the monomers were polymerized at 60° C. for 2 hours. The reaction mixture was adjusted to pH 8 with ammonia water to give 10,000 parts of a resin dispersion having a solid content of 25%.

Preparation Examples 4–6

A resin powder and resin dispersions were obtained in the same manner as in Examples 1 to 3 except that the 2-aminoanthraquinone was replaced with 2-aminoacridone.

EXAMPLE 1

10 Parts of C. I. Pigment Blue 15:1, 1 part of the resin powder (dispersing agent) obtained in Preparation Example 1, 12.5 parts (solid content 20%) of a solution of an acrylic resin having a weight average molecular weight of 25,000 and an acid value of 60, 20 parts of ion-exchanged water and 150 parts of 3 mmφ alumina beads were charged into a 225 ml glass container, and dispersed with a paint conditioner for 3 hours. 37.5 Parts of the same acrylic resin as that used above and 4.3 parts of methylated melamine resin (trade name: Cymel 303, supplied by Mitsui-Cyanamid) were added to the above-prepared dispersion, and fully mixed with it to give a water-based coating composition. The water-based coating composition was developed on a PET film with a 4-mil film applicator and baked at 140° C. for 30 minutes to give a coating having excellent gloss. The coating was measured for 20° gloss with a digital angle-change glossmeter. Table 1 shows the result.

EXAMPLES 2–20

Coating compositions were prepared in the same manner as in Example 1 except that the dispersing agent was replaced with the resin powders and resin dispersions obtained in Preparation Examples 2 to 6 and that the pigment/dispersing agent mixing ratios were changed as shown in Table 1 (provided that the amounts of the resin dispersions were based on solid weights). As a result, coatings having excellent gloss were obtained. The coatings were measured for 20° gloss in the same manner as in Example 1. Table 1 shows the results.

EXAMPLE 21

A wet cake containing 20 parts of C. I. Pigment Blue 15:1 was dispersed in 200 parts of water, and 4.5 parts of the resin dispersion obtained in Preparation Example 2 was added. The mixture was stirred, and filtered. The remaining solid was washed with water, dried and milled to give 23 parts of a pigment composition. A coating composition was prepared from the pigment composition as follows and developed in the following manner.

10 Parts of the above-obtained pigment composition, 12.5 parts (solid content 20%) of a solution of an acrylic resin having a weight average molecular weight of 25,000 and an acid value of 60, 20 parts of ion-exchanged water and 150 parts of 3 mmφ alumina beads were charged into a 225 ml glass container, and dispersed with a paint conditioner for 3 hours. 37.5 Parts of the same acrylic resin as that used above and 4.3 parts of methylated melamine resin (trade name: Cymel 303, supplied by Mitsui-Cyanamid) were added to the above-prepared dispersion, and fully mixed with it to give a water-based coating composition. The water-based coating composition was developed on a PET film with a 4-mil film applicator and baked at 140° C. for 30 minutes to give a coating having excellent gloss. The coating was measured for 20° gloss with a digital angle-change glossmeter. Table 1 shows the result.

EXAMPLES 22–24

A coating composition was prepared by mixing a pigment shown in Table 1 with the pigment dispersion obtained in Preparation Example 2, 3, 5 or 6 in the same manner as in Example 21, and the coating composition was developed in the same manner as in Example 21 to give a coating having excellent gloss. The coating was measured in the same manner as in Example 21. Table 1 shows the result.

Comparative Examples

Coating compositions were prepared from the pigments used in Examples 1 to 24 without using any dispersing agents obtained in Preparation Examples 1 to 6. The coating compositions were developed in the same manner as in Example 1 to give coatings having poor gloss. The coating were measured for 20° gloss in the same manner as in Example 1. Table 1 shows the results.

TABLE 1

| Example No. | Pigment | Dispersing agent obtained in Preparation Example No. | Pigment/ dispersing agent mixing ratio | 20° gloss |
|---|---|---|---|---|
| CEx. | C.I. Pigment Blue 15:1 | — | 10/0 | 33 |
| 1 | C.I. Pigment Blue 15:1 | 1 | 10/1 | 60 |
| 2 | C.I. Pigment Blue 15:1 | 1 | 10/2 | 63 |
| 3 | C.I. Pigment Blue 15:1 | 2 | 10/3 | 66 |
| 21 | C.I. Pigment Blue 15:1 | 2 | 10/2 | 61 |
| 22 | C.I. Pigment Blue 15:1 | 3 | 10/2 | 62 |
| CEx. | C.I. Pigment Yellow 83 | — | 10/0 | 51 |
| 4 | C.I. Pigment Yellow 83 | 4 | 10/2 | 73 |
| CEx. | C.I. Pigment Violet 19 | — | 10/0 | 29 |
| 4 | C.I. Pigment Violet 19 | 2 | 10/2 | 75 |
| 6 | C.I. Pigment Violet 19 | 5 | 10/2 | 71 |
| 23 | C.I. Pigment Violet 19 | 5 | 10/2 | 77 |
| CEx. | C.I. Pigment Violet 23 | — | 10/0 | 33 |
| 7 | C.I. Pigment Violet 23 | 6 | 10/1 | 69 |
| 24 | C.I. Pigment Violet 23 | 6 | 10/2 | 72 |
| CEx. | C.I. Pigment Red 23 | — | 10/0 | 35 |
| 8 | C.I. Pigment Red 23 | 2 | 10/3 | 65 |
| CEx. | C.I. Pigment Red 48:4 | — | 10/0 | 52 |
| 9 | C.I. Pigment Red 48:4 | 2 | 10/1 | 70 |
| CEx. | C.I. Pigment Blue 60 | — | 10/0 | 45 |
| 10 | C.I. Pigment Blue 60 | 3 | 10/2 | 71 |
| CEx. | C.I. Pigment Red 88 | — | 10/0 | 51 |
| 11 | C.I. Pigment Red 88 | 4 | 10/2 | 72 |
| CEx. | C.I. Pigment Red 177 | — | 10/0 | 29 |
| 12 | C.I. Pigment Red 177 | 2 | 10/2 | 73 |
| CEx. | C.I. Pigment Red 178 | — | 10/0 | 53 |
| 13 | C.I. Pigment Red 178 | 5 | 10/2 | 81 |
| CEx. | C.I. Pigment Orange 43 | — | 10/0 | 23 |
| 14 | C.I. Pigment Orange 43 | 6 | 10/2 | 72 |
| CEx. | C.I. Pigment Yellow 24 | — | 10/0 | 45 |
| 15 | C.I. Pigment Yellow 24 | 5 | 10/2 | 70 |
| CEx. | C.I. Pigment Yellow 108 | — | 10/0 | 61 |
| 16 | C.I. Pigment Yellow 108 | 3 | 10/2 | 79 |
| CEx. | C.I. Pigment Red 168 | — | 10/0 | 32 |
| 17 | C.I. Pigment Red 168 | 2 | 10/2 | 75 |
| CEx. | C.I. Pigment Black 11 | — | 10/0 | 41 |
| 18 | C.I. Pigment Black 11 | 5 | 10/2 | 77 |
| CEx. | C.I. Pigment White 6 | — | 10/0 | 88 |
| 19 | C.I. Pigment White 6 | 3 | 10/2 | 76 |
| CEx. | C.I. Pigment Red 101 | — | 10/0 | 78 |
| 20 | C.I. Pigment Red 101 | 2 | 10/2 | 85 |

CEx. = Comparative Example

The pigment-dispersing agents derived from the organic dyestuffs and the production of the water-based coating compositions containing the pigment-dispersing agents will be explained hereinafter by reference to Examples.

Preparation Example 7

Preparation of dispersing agent

43 Parts of p-phenylenediaminediamine was dissolved in 1,000 parts of methanol, and a methanol wet cake containing 145 parts of copper phthalocyaninesulfonyl chloride (containing 1.5 chlorosulfonyl groups per molecule on the average) was added. The mixture was stirred at 60° C. for 1 hour, and then filtered. The resultant solid was washed with methanol, dried at 60° C. and milled to give 160 parts of a blue powder (compound a).

Preparation Example 8

43 Parts of p-phenylenediaminediamine was dissolved in 2,000 parts of dimethylformamide, and 135 parts of chloromethyl copper phthalocyanine (containing 2 chloromethyl groups per molecule on the average) was added. The mixture was stirred at 100° C. for 3 hour, and then filtered. The resultant solid was washed with water, dried at 80° C. and milled to give 155 parts of a blue powder (compound b).

Preparation Example 9

43 Parts of p-phenylenediaminediamine was dissolved in 1,000 parts of methanol, and a methanol wet cake containing 83.5 parts of chloroacetoaminomethylquinacridone (containing 1.5 chloroacetoaminomethyl group per molecule on the average) was added, The mixture was stirred at 60° C. for 1 hour, and then filtered. The resultant solid was washed with methanol, dried at 60° C. and milled to give 95 parts of a red powder (compound c).

Preparation Examples 10–17

Compounds d to k shown in Table 2 were prepared according to Examples 7 to 9.

TABLE 2

| Preparation Example No. | Compound | Organic dyestuffs | Substituent | Number of substituents |
|---|---|---|---|---|
| 7 | a | C.I. Pigment Blue 15 | —SO$_2$NHC$_6$H$_4$NH$_2$ | 1.5 |
| 8 | b | C.I. Pigment Blue 15 | —CH$_2$NHC$_6$H$_4$NH$_2$ | 2 |
| 9 | c | C.I. Pigment Violet 19 | —CH$_2$NHCOCH$_2$NHC$_6$H$_4$NH$_2$ | 1 |
| 10 | d | C.I. Pigment Violet 23 | —SO$_2$NHC$_6$H$_4$NH$_2$ | 2 |
| 11 | e | C.I. Pigment Orange 43 | —SO$_2$NHC$_6$H$_4$NH$_2$ | 1 |
| 12 | f | C.I. Pigment Yellow 24 | —SO$_2$NHC$_6$H$_4$NH$_2$ | 1 |
| 13 | g | C.I. Pigment Red 178 | —SO$_2$NHC$_6$H$_4$NH$_2$ | 1 |
| 14 | h | C.I. Pigment Yellow 108 | —SO$_2$NHC$_6$H$_4$NH$_2$ | 1 |
| 15 | i | C.I. Pigment Red 168 | —SO$_2$NHC$_6$H$_4$NH$_2$ | 1 |
| 16 | j | C.I. Pigment Blue 60 | —SO$_2$NHC$_6$H$_4$NH$_2$ | 1 |
| 17 | k | C.I. Pigment Red 88 | —SO$_2$NHC$_6$H$_4$NH$_2$ | 1 |
| 18 | l | C.I. Pigment Yellow 83 | —NH$_2$ | 1 |
| 19 | m | C.I. Pigment Red 2 | —NH$_2$ | 1 |

Preparation Example 18

38.4 Parts of 4-amino-acetoacetoanilide was suspended in 1,000 parts of water, and coupled with a diazonium liquid prepared by diazotizing 4,4'-dichlorobenzene by a conventional method. The reaction mixture was filtered, and the remaining solid was washed with water and dried to give 130 parts of a yellow powder (compound l).

Preparation Example 19

43 Parts of p-phenylenediamine was dissolved in 1,000 parts of methanol, and 41 parts of β-oxynaphthoic acid chloride was added. The mixture was stirred at 60° C. for 1 hour. 1,000 Parts of water was added to precipitate a product completely. The mixture was filtered, and the remaining solid was washed with water, dried at 60° C. and milled to give 55 parts of a white powder. The white powder as a coupling component was coupled with a diazonium liquid prepared by diazotizing 2,5-dichloroaniline by a conventional method. The reaction mixture was filtered, and the remaining solid was washed with water and dried to give 90 parts of a red powder (compound m).

Preparation Example 20

0.7 Part of sodium nitrite was added to 20 parts of cooled 98% sulfuric acid, and the mixture was heated up to 70° C. The mixture was again cooled, and 5.5 parts of the compound a was added at a temperature of 10° C. or lower. The mixture was stirred at 10° C. for 1 hour, and dropwise added to a solution containing 10 parts of ethyl acrylate cooled to 10° C. or lower, 10 parts of methyl methacrylate, 5 parts of methacrylic acid and 50 parts of diethylene glycol dimethyl ether. These monomers were polymerized by heating the mixture in nitrogen current at 80° C. for 2 hours, and then 100 parts of water was added to precipitate a resin content. The resin content was recovered by filtration, washed with water, dried and milled to give 24 parts of a resin powder (dispersing agent A).

Preparation Example 21

0.7 Part of sodium nitrite was added to 20 parts of cooled 98% sulfuric acid, and the mixture was heated up to 70° C. The mixture was again cooled, and 4 parts of the compound b was added at a temperature of 10° C. or lower, The mixture was stirred at 10° C. for 1 hour and then added dropwise to 200 parts of a 25% zinc chloride aqueous solution cooled to 10° C. or lower to precipitate a zinc chloride double salt of a diazonium compound. The double salt was recovered by filtration and washed with water to obtain a press cake. The press cake was dispersed in a solution containing 10 parts of ethyl acrylate, 10 parts of methyl methacrylate, 5 parts of methacrylic acid and 50 parts of diethylene glycol dimethyl ether, and the mixture was stirred in nitrogen current for 30 minutes. Then, 5 parts of a 20% titanium trichloride aqueous solution was added, and these monomers were polymerized at 60° C. for 2 hours. The reaction mixture was adjusted to pH 8 with a triethanolamine aqueous solution to give 100 parts of a resin dispersion having a solid content of 22% (dispersing agent B).

Preparation Example 22

0.7 Part of sodium nitrite was added to 20 parts of cooled 98% sulfuric acid, and the mixture was heated up to 70° C. The mixture was again cooled, and 4.9 parts of the compound c was added at a temperature of 10° C. or lower. The mixture was stirred at 10° C. for 1 hour and then added dropwise to 200 parts of a 25% zinc chloride aqueous solution cooled to 10° C. or lower to precipitate a zinc chloride double salt of a diazonium compound. The double salt was recovered by filtration and washed with water to obtain a press cake. The press cake was dispersed in a cooled emulsifier solution containing 10 parts of ethyl acrylate, 10 parts of methyl methacrylate, 5 parts of methacrylic acid, 2 parts of sodium laurylsulfate and 50 parts of water, and the mixture was stirred in nitrogen current for 30 minutes. Then, 5 parts of a 20% titanium trichloride aqueous solution was added, and these monomers were polymerized at 60° C. for 2 hours. The reaction mixture was adjusted to pH 8 with ammonia water to give 10.0 parts of a resin dispersion having a solid content of 25% (dispersing agent C).

Preparation Examples 23–30

Dispersing agents D to M (resin powder or resin dispersion) were obtained using the compounds d to m in the same manner as in Preparation Examples 20 to 22.

EXAMPLE 25

10 Parts of C. I. Pigment Blue 15:1, 1 part of the dispersing agent A, 12.5 parts (solid content 20%) of a solution of an acrylic resin having a weight average molecular weight of 25,000 and an acid value of 60, 20 parts of ion-exchanged water and 150 parts of 3 mmφ alumina beads were charged into a 225 ml glass container, and dispersed with a paint conditioner for 3 hours. 37.5 Parts of the same acrylic resin as that used above and 4.3 parts of methylated melamine resin (trade name: Cymel 303, supplied by Mitsui-Cyanamid) were added to the above-prepared dispersion, and fully mixed with it to give a water-based coating composition. The water-based coating composition was developed on a PET film with a 4-mil film applicator and baked at 140° C. for 30 minutes to give a coating having excellent gloss. The coating was measured for 20° gloss with a digital angle-change glossmeter. Table 3 shows the result.

EXAMPLES 26–43

Coating compositions were prepared in the same manner as in Example 25 except that the dispersing agent was replaced with the dispersing agents B to M and that the pigment/dispersing agent mixing ratios were changed as shown in Table 3 (provided that the amounts of the resin dispersions were based on solid weights). As a result, coatings having excellent gloss were obtained. The coatings were measured for 20° gloss in the same manner as in Example 25. Table 3 shows the results.

EXAMPLE 44

A wet cake containing 20 parts of C. I. Pigment Blue 15:1 was dispersed in 200 parts of water, and 4.5 parts of the dispersing agent B was added to, and mixed with, the dispersion. The mixture was filtered, and the remaining solid was washed with water, dried and milled to give 23 parts of a pigment composition. A coating composition was prepared from the so-obtained pigment composition and developed to give a coating having excellent gloss. The coating was measured for 20° gloss. Table 3 shows the results.

EXAMPLES 45–47

A coating composition was prepared by mixing a pigment shown in Table 3 with one of the dispersing agents A to M in the same manner as in Example 25, and the coating composition was developed in the same manner as in Example 25 to give a coating having excellent gloss. The coating was measured in the same manner as in Example 25. Table 3 shows the result.

Comparative Examples

Coating compositions were prepared from the pigments used in Examples 25 to 47 without using any dispersing agents. The coating compositions were developed in the same manner as in Example 25 to give coatings having poor gloss. The coating were measured for 20° gloss in the same manner as in Example 25. Table 3 shows the results.

TABLE 3

| Example No. | Pigment | Dispersing agent | Pigment/ dispersing agent mixing ratio | 20° gloss |
|---|---|---|---|---|
| CEx. | C.I. Pigment Blue 15:1 | — | 10/0 | 33 |
| 25 | C.I. Pigment Blue 15:1 | A | 10/1 | 67 |
| 26 | C.I. Pigment Blue 15:1 | A | 10/2 | 78 |
| 27 | C.I. Pigment Blue 15:1 | A | 10/3 | 80 |
| 44 | C.I. Pigment Blue 15:1 | B | 10/2 | 74 |
| 45 | C.I. Pigment Blue 15:1 | B | 10/2 | 75 |
| CEx. | C.I. Pigment Yellow 83 | — | 10/0 | 51 |
| 28 | C.I. Pigment Yellow 83 | L | 10/2 | 79 |
| CEx. | C.I. Pigment Violet 19 | — | 10/0 | 29 |
| 29 | C.I. Pigment Violet 19 | C | 10/2 | 79 |
| 30 | C.I. Pigment Violet 19 | C | 10/2 | 76 |
| 46 | C.I. Pigment Violet 19 | C | 10/2 | 81 |
| CEx. | C.I. Pigment Violet 23 | — | 10/0 | 33 |
| 31 | C.I. Pigment Violet 23 | D | 10/1 | 75 |
| 47 | C.I. Pigment Violet 23 | D | 10/2 | 79 |
| CEx. | C.I. Pigment Red 23 | — | 10/0 | 35 |
| 32 | C.I. Pigment Red 23 | M | 10/3 | 68 |
| CEx. | C.I. Pigment Red 48:4 | — | 10/0 | 52 |
| 33 | C.I. Pigment Red 48:4 | M | 10/1 | 76 |
| CEx. | C.I. Pigment Blue 60 | — | 10/0 | 45 |
| 34 | C.I. Pigment Blue 60 | J | 10/2 | 75 |
| CEx. | C.I. Pigment Red 88 | — | 10/0 | 51 |
| 35 | C.I. Pigment Red 88 | K | 10/2 | 79 |
| CEx. | C.I. Pigment Red 177 | — | 10/0 | 29 |
| 36 | C.I. Pigment Red 177 | C | 10/2 | 79 |
| CEx. | C.I. Pigment Red 178 | — | 10/0 | 53 |
| 37 | C.I. Pigment Red 178 | G | 10/2 | 88 |
| CEx. | C.I. Pigment Orange 43 | — | 10/0 | 23 |
| 38 | C.I. Pigment Orange 43 | E | 10/2 | 77 |
| CEx. | C.I. Pigment Yellow 24 | — | 10/0 | 45 |
| 39 | C.I. Pigment Yellow 24 | F | 10/2 | 76 |
| CEx. | C.I. Pigment Yellow 108 | — | 10/0 | 61 |
| 40 | C.I. Pigment Yellow 108 | H | 10/2 | 84 |
| CEx. | C.I. Pigment Red 168 | — | 10/0 | 32 |
| 41 | C.I. Pigment Red 168 | I | 10/2 | 79 |
| CEx. | C.I. Pigment Black 11 | — | 10/0 | 41 |
| 42 | C.I. Pigment Black 11 | A | 10/2 | 79 |
| CEx. | C.I. Pigment Red 101 | — | 10/0 | 78 |
| 43 | C.I. Pigment Red 101 | C | 10/2 | 91 |

CEx. = Comparative Example

What is claimed is:

1. A pigment composition containing (A) 0.1 to 30 parts by weight of a pigment-dispersing agent obtained by polymerizing an addition-polymerizable monomer having an acidic functional group and other addition-polymerizable monomer in the presence of a polymerization initiator, wherein the addition-polymerizable monomer having an acidic functional group is present in an amount of 5 to 30% by weight based on the total amount of the addition-polymerizable monomer having an acidic functional group and the other addition-polymerizable monomer;

the polymerization initiator being a diazotization product prepared by diazotizing at least one compound selected from the group consisting of an anthraquinone derivative having an aromatic amino group and an acridone derivative having an aromatic amino group;

wherein the anthraquinone derivative having an aromatic amino group or the acridone derivative having an aromatic amino group is a compound selected from the group consisting of a compound in which an amino group directly bonds to an anthraquinone or acridone skeleton and a compound in which an aromatic amino compound bonds to an anthraquinone or acridone skeleton through a divalent binding group selected from the group consisting of —SO$_2$—, —CO—, —CH$_2$NHCOCH$_2$— and —CH$_2$— and (B) 100 parts by weight of a pigment.

2. A pigment composition according to claim 1 wherein the pigment-dispersing agent is obtained by polymerizing the addition-polymerizable monomer having an acidic functional group and the other addition-polymerizable monomer in a total amount of 10 to 10,000 moles per mole of the polymerization initiator.

3. A pigment composition according to claim 1 wherein the pigment-dispersing agent has a weight average molecular weight of 2,000 to 100,000.

4. A water-based pigment dispersion comprising the pigment composition recited in claim 1, and a water-dispersible or water-soluble resin.

5. A water-based pigment dispersion according to claim 4, which contains 100 parts by weight of a pigment, 0.1 to 30 parts by weight of the pigment-dispersing agent and 5 to 200 parts by weight, as a solid content, of a water-dispersible or water-soluble resin.

* * * * *